(12) United States Patent
Haberland et al.

(10) Patent No.: US 7,492,310 B2
(45) Date of Patent: Feb. 17, 2009

(54) MOTOR VEHICLE WHEEL BEHAVIOUR AND RADAR SYSTEM

(75) Inventors: Udo Haberland, Holzgerlingen (DE); Urs Luebbert, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 8 days.

(21) Appl. No.: 12/057,450

(22) Filed: Mar. 28, 2008

(65) Prior Publication Data

US 2008/0191928 A1  Aug. 14, 2008

Related U.S. Application Data

(63) Continuation of application No. PCT/EP2006/008325, filed on Aug. 25, 2006.

(30) Foreign Application Priority Data

Sep. 29, 2005 (DE) .................. 10 2005 048 209

(51) Int. Cl.
*G01S 13/42* (2006.01)
(52) U.S. Cl. ............... 342/70; 342/109; 342/128
(58) Field of Classification Search ........... 342/70–72, 342/109–112, 118, 128–132; 340/435, 436, 340/903; 701/301
See application file for complete search history.

(56) References Cited

U.S. PATENT DOCUMENTS 3,860,923 A * 1/1975 Yamanaka et al. ........... 342/72

6,043,773 A    3/2000 Watanabe
6,587,074 B1 * 7/2003 Winter et al. ............... 342/130
2004/0257266 A1  12/2004 Pleva et al.

(Continued)

FOREIGN PATENT DOCUMENTS

DE    196 10 970 A1    9/1997

(Continued)

OTHER PUBLICATIONS

"Time division multiplexing antenna array using sum-difference analysis with single transmit/receive channel for automotive application", Li Yang; Liang Liwan; Pan Weifeng; Chen Yaqin; Feng Zhenghe Infrared and Millimeter Waves, 2000. Conference Digest. 2000 25th International Conference on 2000 Ps:467-468.*

(Continued)

*Primary Examiner*—John B Sotomayor
(74) *Attorney, Agent, or Firm*—Brinks Hofer Gilson & Lione

(57) ABSTRACT

An FMCW radar method is presented in which a radar system of a motor vehicle emits and receives radar waves, and in which a distance between an object and the motor vehicle is determined from a frequency shift between transmitted and received radar waves, and in which a speed of an object is determined from phase positions of received radar waves. The method is defined by the fact that in first time periods (T_A, T_B) it is carried out for objects in at least a first partial area (A, B) of the surroundings of the motor vehicle, and in second time period (T_C, T_D, T_E, T_F, T_G) distances, but not speeds, are determined for objects in at least a second partial area (C, D, E, F, G) of the surroundings.

18 Claims, 3 Drawing Sheets

U.S. PATENT DOCUMENTS

2005/0134440 A1\* 6/2005 Breed .................... 340/435
2006/0187112 A1\* 8/2006 Nalezinski et al. .......... 342/118
2007/0152871 A1\* 7/2007 Puglia .................... 342/70
2008/0088499 A1\* 4/2008 Bonthron et al. ............ 342/104

FOREIGN PATENT DOCUMENTS

| DE | 199 63 005 A1 | 6/2001 |
|---|---|---|
| DE | 10 2005 048 209 A1 | 4/2007 |
| EP | 863409 A1 \* | 9/1998 |
| WO | WO 02/14898 A2 | 2/2002 |
| WO | WO 2006066781 A2 \* | 6/2006 |
| WO | WO 2007/036273 A1 | 4/2007 |

OTHER PUBLICATIONS

International Search Report for PCT/EP2006/008325.
Search Report for DE 10 2005 048 209.0.

\* cited by examiner

MOTOR VEHICLE WHEEL BEHAVIOUR AND RADAR SYSTEM

CROSS-REFERENCE TO RELATED APPLICATIONS

This application is a continuation of International Application No. PCT/EP2006/008325 filed on Aug. 25, 2006, which claims the benefit of DE 10 2005 048 209.0, filed Sep. 29, 2005. The disclosures of the above applications are incorporated herein by reference.

FIELD

The invention concerns a radar system for a motor vehicle and a frequency modulated continuous wave (FMCW) radar method for use with motor vehicles to determine the distance of an object from a motor vehicle.

BACKGROUND

The statements in this section merely provide background information related to the present disclosure and may not constitute prior art.

A FMCW radar method involves the use of a radar system of a motor vehicle that emits and receives radar waves, and in which a distance to an object with respect to the motor vehicle can be determined based on a frequency shift between the emitted and received radar waves and in which a speed of an object may be determined based on the phase positions of received radar waves.

A method of this kind and a radar system such as this are known from DE 196 10 970 A1. Very generally, the frequency of emitted radar waves is periodically varied in time in a FMCW radar system according to a predetermined pattern. Radar waves reflected on an object have traveled twice the distance to the object when they are received by the radar system and meet again in the radar system with a time delay that is proportional thereto.

Since the frequency of the radar waves to be emitted has changed during this time delay, the emitted signals and received signals propagating within the radar system have a frequency difference d_f(r) at a specific time point, which is dependent on the object distance r and the type of emission frequency variation. With linear time variation and object at rest relative to the radar system, d_f(r) is directly proportional to the object distance. During a relative movement with relative speed v, there occurs in addition a speed-dependent Doppler shift of the frequency, whose sign is dependent on the direction of the speed and on the sign of the emission frequency variation.

In order to determine the frequency difference, the emitted signal is usually mixed with the received signal and forms an intermediate frequency signal, which has as a consequence a spectral signal portion within the magnitude of the frequency difference and further portions with higher frequencies. Through the use of low pass filtering, the portions with higher frequencies are separated and the remaining signal, in which the runtime-dependent and speed-dependent frequency shifts are reproduced, is spectrally analyzed.

According to DE 196 10 970 A1, a frequency value (spectral line) is essentially obtained for the periodic amplification of the emission frequency in the sum of the distance-dependent and speed-dependent frequency shifts, while a frequency value in the difference of the mentioned frequency shifts is obtained for periodic reductions of the emission frequency. By forming the mean value and difference of these frequency values, the values of the distance-dependent and speed-dependent frequency shifts can be individually determined. The distances and the speeds are thus ultimately determined in this evaluation from the frequency of the intermediate frequency signal. This requires, however, a clear allocation of spectral lines and objects, which, in case of several reflecting objects at similar distances, is not readily ascertainable.

In order to determine the distances and speeds of each individual object when there are several objects, the initially mentioned DE 196 10 970 A1 proposes to derive the distances from the frequency of the intermediate frequency signal and the speeds from the phase [position] information of the intermediate frequency signal. According to DE 196 10 970 A1, the argument of the intermediate frequency signal, in other words its phase, thus contains especially a distance-dependent term. Since the distance changes slightly between two periods of the emission frequency variation in case of a relative movement between radar systems and object, the distance-dependent term in the phase position of the intermediate frequency signal also changes. From the extent of change of the phase [position] during at least two periods of the emission frequency variation should be deduced the relative speed according to DE 196 10 970 A1. The phase [position] information is respectively obtained from a phase position of a Fourier transform of the intermediate frequency signal. In order to obtain two phase values, two periods of the variation of the emitted signal must therefore be run through for each object and a Fourier transform must be carried out for each period.

SUMMARY

Radar systems for monitoring the vehicle proximity are used in motor vehicles, in which applications such as parking interval control system, dead angle monitoring, lane change assistance, door opening assistance, accident anticipation (pre-crash sensing) for airbag deployment, belt tightening, rollover bar activation, start/stop operation or driving operation with interval monitoring and/or interval control (cruise control support) are taken into consideration.

In specific traffic situations, for example with dense traffic on a street with multiple lanes, a multitude of objects can exist within the area surrounding a motor vehicle. Different objects can have similar distances but different speeds. Different sequences for the selection of the lane and travel speed for a driver and/or a driver assistance system are obtained depending on the position and speed of an object. When a change to a specific lane is planned, the positions and speeds of other vehicles within a relatively large angular range must be estimated in order to avoid collisions. The angular range has an order of magnitude of 180° to allow a detection of vehicles that approach or distance themselves from the rear of the vehicle, vehicles within the field of vision, and vehicles that approach or distance themselves in the direction of travel. An accurate detection of all positions and speeds requires thus a specific time. Due to the usually different speeds of neighboring objects, the overall situation in the area surrounding the motor vehicle can clearly change relatively rapidly. For this reason, high information actualization rates (update rates) are required for motor vehicle radar systems.

Demands for a high information actualization rate in connection with a possible multitude of objects within a large angular range are in opposition to the demands for the best possible resolution of the speeds of the individual objects.

Taking this into consideration, one aspect of the present invention is a radar method of a motor vehicle radar system, which provides a driver assistance system or a driver with the essential information about objects within the vehicle's surrounding area required for the avoidance of collisions with a high update rate and a good resolution of distances and speeds of individual objects.

Thus, the present disclosure includes a radar method of the type described above in such a way that the method is carried out in first time segments for objects within at least one first partial sector of a field surrounding the motor vehicle, and distances, but not speeds, of objects within at least a second partial sector of the surrounding field are determined in second time segments.

The speeds that can be determined in principle by a radar system moving with a first motor vehicle are always relative speeds. They indicate how fast a radial distance to the first motor vehicle and other motor vehicles or objects changes. Different vehicles in different lanes can move along this direction with very different speeds. Very different radial relative speeds can occur parallel and antiparallel to the travel direction of the first motor vehicle, while the (radial) relative speed of a further vehicle, which is located beside the first vehicle, is as a rule approximately equal to zero. The latter case represents therefore an example of a partial sector, in which the distance information, or the information concerning whether an object is actually beside the first vehicle, is sufficient.

Because the present method differentiates between the first partial sectors and the second partial sectors, the number of the data to be processed within a time segment is reduced, which facilitates the signal processing. Objects that are located at the same distance, but at different angular positions, for example, are easier to detect than different objects.

The sequential scanning of different partial sectors has, however, the disadvantage that data from a specific partial sector are actualized only after scanning the other partial sectors. In principle, this can lead to an undesirable reduction of the update rate. With regard to the update rate, it is also disadvantageous that the determination of the speeds with the initially mentioned FMCW radar methods demands more time than the determination of the distances. In sum, the full detection of the speeds of all of the objects in connection with the segmentation of the vehicle proximity into sequential partial sectors to be scanned, can therefore lead to update rates that are no longer sufficient for motor vehicle applications.

In a preferred form, the invention prevents this by carrying out the time-consuming determination of speeds only within the first partial sectors. Because the speed is determined only in the at least one partial sector, the radar method is differently optimized in the first and second partial sectors.

It is preferred that the frequency of the emitted radar waves is periodically modulated, the phase positions for a first number of periods are determined, and the frequency shift for a second number of periods of modulation is determined.

The number of periods represents an optimization parameter which can influence the length of the time segments. The length of the time segments increases with the number of periods. The determination of the speeds based on the first number of periods and the distances based on the second number of periods leads to differences in the lengths of the first periods and second periods, assuming that the first number and the second number are different.

For a high-resolution and accurate speed measurement, it is preferable to have a higher number of periods than for a distance measurement. The first number is therefore preferably greater than the second number.

The first number is also preferably greater than or equal to 16 and the second number is preferably equal to 1.

It has been discovered that these numbers allow a good compromise between the conflicting demands for a high update rate and the highest possible resolution of distances and speeds.

In one preferred form, the first number is equal to 32. The resolution of the speeds of different objects is considerably improved with increasing values of the first number. On the other hand, the update rate is then again reduced. The number 32 is therefore to be understood as a compromise, which delivers a further improved resolution with passable update rates.

The distances are also preferably determined with the aid of a first Fourier transform which is applied on a low pass filtered mixture product of an emitted signal and a received signal, and the speeds are determined with the aid of a second Fourier transform which is applied on phase positions of results of several first Fourier transforms.

A phase position is understood herein as any value based on which the phase of the reflected radar signal can be determined at the receiver. The results of the first Fourier transform are generally complex numbers, of which it is known that they can be characterized in a vector representation by means of the magnitude and the phase. In this application, a phase position is to be understood, depending on the context, as the complex number or its angular argument.

The first Fourier transform provides the frequency shifts, which are used in the following as a measurement of the distances of the objects. The meaning of the second Fourier transform is developed, for example, by representing the phase positions in the vector diagram as vector positions [settings]. A multitude of objects results in a corresponding multitude of vectors. The second Fourier transform supplies in this figure all the sought speeds as a result of a Fourier transform in the form of the rotatory frequencies of all the vectors. The rotatory frequencies of the vectors form individual changes of the phases and thus the locations or distances of the objects.

In one form, the present invention contemplates the differentiation of objects from each other by means of their distances and/or speeds.

By determining the generally different speeds and their allocation to specific objects, objects that are not yet resolved can also be differentiated from each other by means of the mere distance determination.

In practical tests, it has been shown that a period duration of the modulation of emitted radar waves, which is less than half a millisecond (ms), provides a good compromise between the demands for a high update rate and a high resolution of speeds.

The individual partial sectors of a coherent detection range of the radar system are preferably covered and a number of the first partial sectors is preferably smaller than a number of the second partial sectors. Therefore, dead angles may be avoided within the detection range. The smaller the number of the first partial sector, the greater the update rate. This configuration optimizes therefore the update rate.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 3:
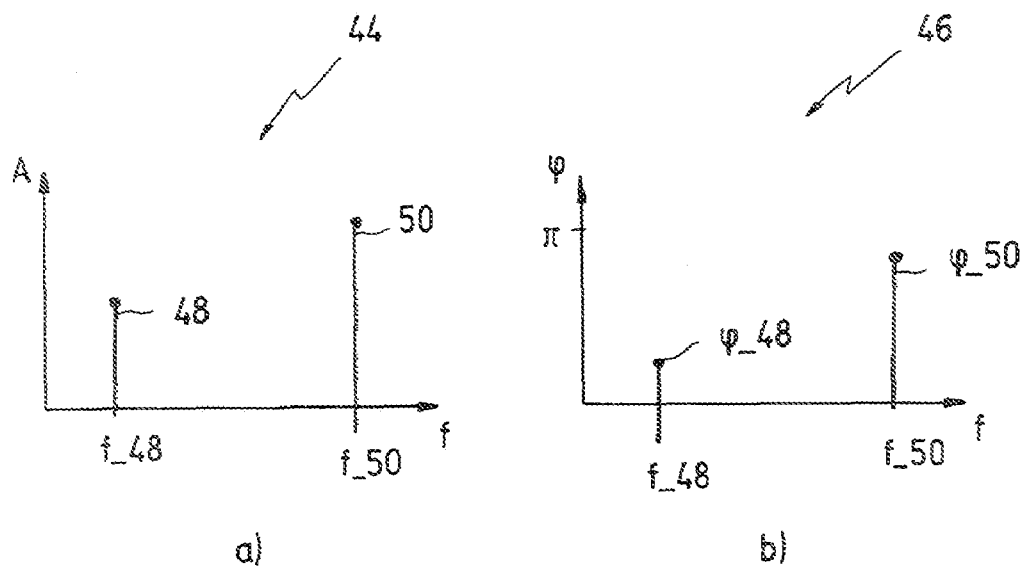
FIG. 3a is a graphical illustration of an amplitude spectrum of a first Fourier transform of a received signal in accordance with the principles of the present invention.
Figure 4:
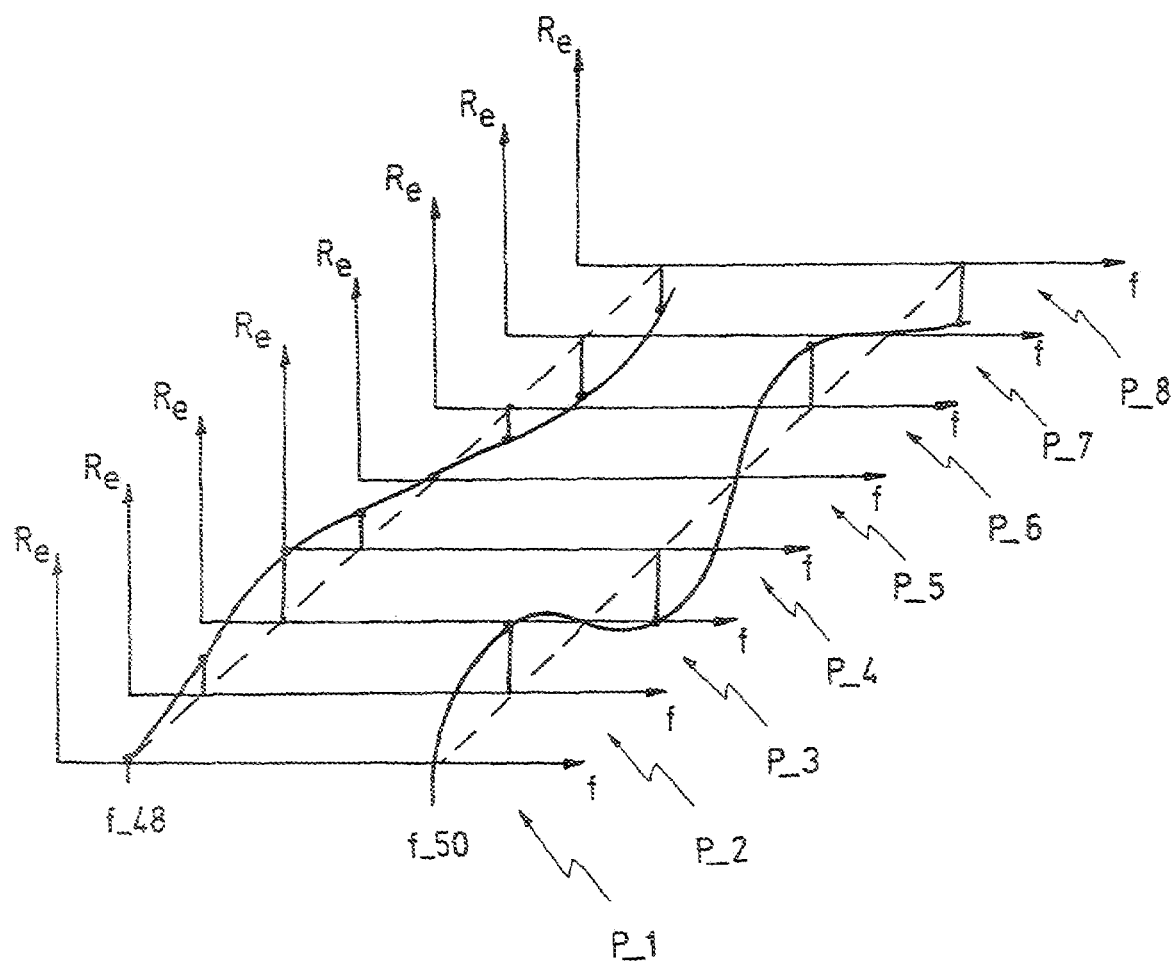

FIG. 3b is a graphical illustration of a phase spectrum of a first Fourier transform of a received signal in accordance with the principles of the present invention; and FIG. 4 is a graphical illustration of the real parts of the results obtained of several first Fourier transforms, as they were recorded and evaluated in an exemplary embodiment of a method according to the principles of the present invention.

DETAILED DESCRIPTION

The following description is merely exemplary in nature and is not intended to limit the present disclosure, application, or uses.

Figure 1:
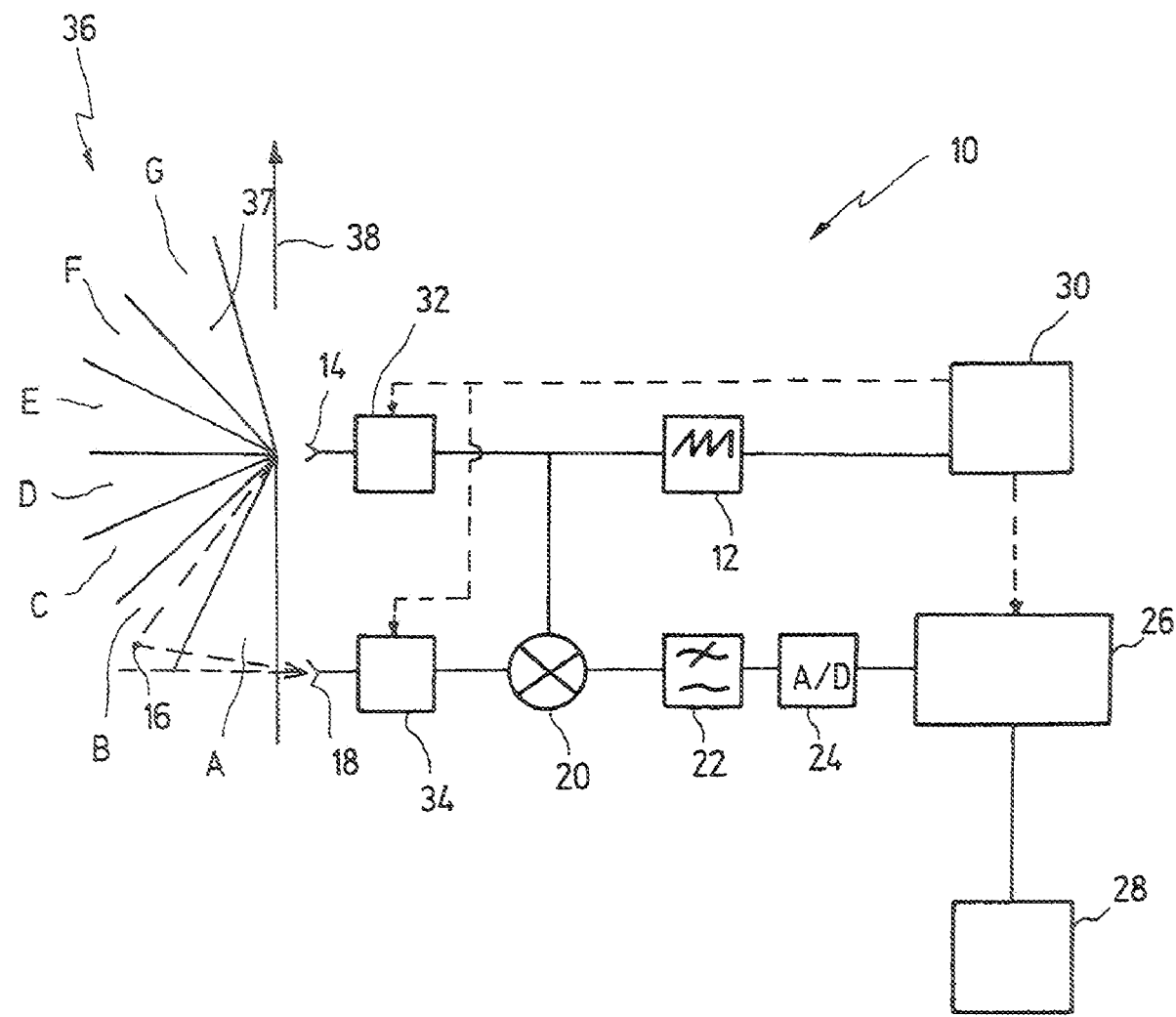
FIG. 1 is a schematic diagram of a radar system according to the principles of the present invention.

FIG. 1 illustrates a radar system 10 of a motor vehicle, which operates according to the FMCW principle. A signal generator 12 generates emission signals with periodically modulated frequency. These emission signals are emitted via an emitting antenna array 14 in the form of radar waves. Radar waves reflected by an object 16, which run back to the radar system 10, are converted into electric reception signals by a receiving antenna array 18. A mixer 20 mixes these received signals with emitted signals, as they are also supplied to the emitting antenna 14. The mixed product contains a signal portion of a difference frequency and a phase position, from which in principle the distance and the speed of the object can be determined. This difference frequency corresponds to the frequency shift between emitted signal and received signal and is correspondingly smaller than the frequency of the emitted signal.

In a low pass filter 22, the signal portions that have a frequency higher than the difference frequency are separated before the remaining signal is discretized by means of an analog-digital converter 24 and further processed in discretized form in a digital signal processor 26. A display device 28 shows the driver the results of the further processing. A control 30 synchronizes the activities of the digital signal processor 26, the signal generator 12, and an antenna circuit 32, which controls the emitting antenna array 14, and/or an antenna circuit 34, which controls the receiving antenna array 18.

In one form, the emitting antenna array 14 is controlled in such a way that it illuminates successive different partial sectors A, B, C, D, E, F, G in a proximity 36 of the motor vehicle. As a rule, an emitting lobe of the emitting antenna array 14 is electronically pivoted according to the phased array principle. In some forms, the receiving antenna array 18 has a wide reception characteristic, with which the entire proximity 36 can be covered. In addition, or in the alternative, narrow angular reception ranges can be used in connection with wide emitting lobes. The control of the emitting antenna array 14 and/or the receiving antenna array 18 is such that objects 16, 37, which are located in different partial sectors B, G of the proximity 36, are separately detected at different times. A range from which radar signals can be received and processed at a specific time point is called in the following also an active range.

In one form, the antenna arrays 14 and 18 are arranged on the left side of the rear of the motor vehicle moving in a direction of travel indicated by the arrow 38. The proximity 36, which is periodically scanned according to sectors by the radar system, extends then, for example, over an angle on the order of magnitude of 180°, which is enclosed, for example, by the direction of travel 38 and its opposite direction. In the embodiment of FIG. 1, the proximity 36 is equidistantly divided into seven partial sectors A, B, C, D, E, F, G. It is understood, however, that the division does not have to be equidistant and can also have more or less partial sectors. The radar method with which the radar system 10 is operated is carried out in first time segments for objects within at least one first partial sector of a proximity of the motor vehicle, and distances, but not speeds, of objects within at least one second partial sector of the proximity are determined in second time segments.

In the embodiment of FIG. 1, the partial sectors A and B are for this purpose first partial sectors, while the remaining partial sectors C, D, E, F and G are second partial sectors. In the case of the partial sector D, the radial speed of other vehicles is, as a rule, negligible. When a lane change is planned, it is important, however, to determine if an object is indeed located there. This applies essentially also to the partial sectors C and E. The partial sectors F and G are located within the field of vision of the driver, so that a speed determination by means of the radar system 10 can there likewise be omitted.

On the other hand, it is desirable under certain conditions, for example, when a lane change is planned, to know the speed and distance of another vehicle which approaches from behind and is outside of the field of vision of the driver and is detected by the radar system 10 within the partial sector A or B. For this reason, the complicated speed determination is undertaken here, while the distances of all objects within the first partial sectors A and B and the second partial sectors C, D, E, F and G are determined. It is understood, however, that this allocation of the partial sectors A to G to the first and to the second partial sectors is not mandatory, and the division can also be made differently.

Figure 2:
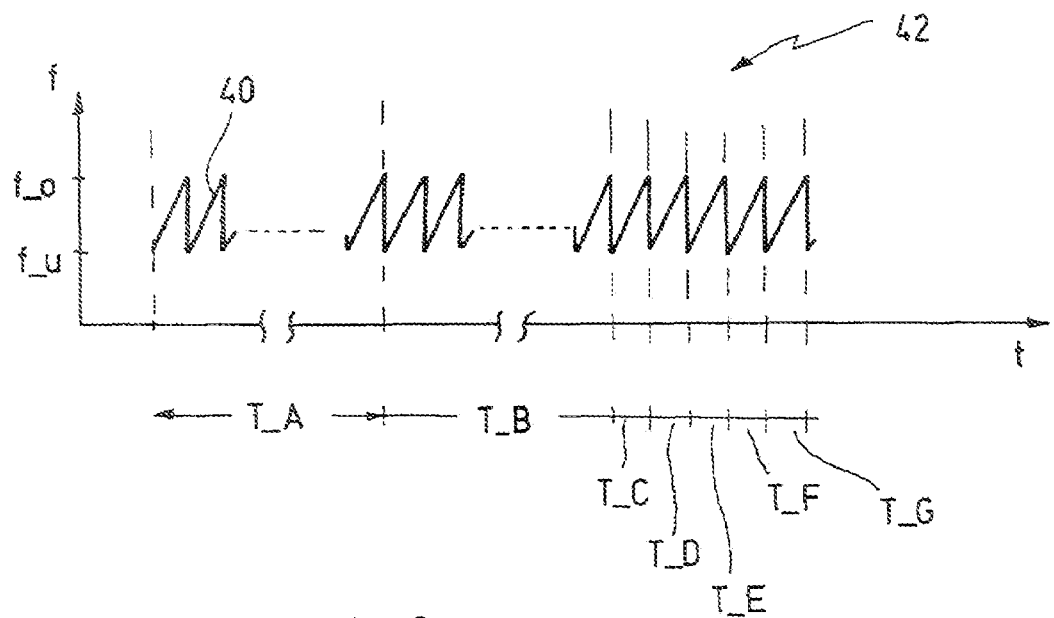
FIG. 2 is a graph of a time characteristic of an emitted signal during the implementation of a method according to the principles of the invention.

FIG. 2 shows the differences in the control of the antenna array 14 and/or 18 in connection with the modulation of the frequency of the emitted signal that occurs therein within a cycle of the sequential scanning of the proximity 36. The frequency f of the emitted signal is periodically increased in a ramp-like manner in this embodiment to an upper limit value f_o and is then reset by steps to a lower limit value f_u. An individual frequency ramp 40 is called a chirp.

Parallel to the resulting characteristic 42 of the frequency of the emitted signal takes place also the control of the antenna arrays 14 and/or 18, so that during a first time segment T_A, which extends over a first number n_1 of periods of the frequency modulation (n_1 chirps), distances and speeds of objects within the first partial sector A are determined. Accordingly, distances and speeds of objects within the further first partial sectors B are determined thereafter during the further first time segments T_B.

The control of the antenna arrays 14 and/or 18 for the second time segments T_C, T_D, T_E, T_F, and T_G is carried out, instead, in such a way that respectively after one second number n_2 of periods within the characteristic 40 to which another segment in the proximity 36 is switched over, and respectively only distances but not speeds of objects are determined in these segments. The second number n_2 is smaller than the first number n_1 and preferably has the value 1 therein and thus also in the representation of FIG. 2. The value of the first number n_1 is, instead, preferably greater than 16 and has, for example, the value 32. Deviating from the representation of FIG. 2, the switchover can also take place in another order of partial sectors A, B, C, . . . .

The distances can at least be determined by approximation from a chirp 40. The frequency shift between emitted signal and received signal to be evaluated depends basically on the distance and the speed of the objects. The smaller the bandwidth of the modulation is and the slower the modulation is carried out, the less the distance dependency turns out to be. In the extreme case of a disappearing modulation, when the transmission takes place continuously only with one frequency, the frequency of the received signal corresponds up to an offset, which is caused by the speed-dependent Doppler effect, to the emitting frequency. If the frequency modulation occurs, instead, rapidly and over a large bandwidth, the influence of the distance on the frequency shift is dominant.

In one form, each chirp 40 consists of a frequency ramp of 24.05 GHz to 24.35 GHz, which is run through in 256 microseconds. In this way, the chirps are sufficiently short and steep, so that a dominant distance dependency can be assumed. When reflected radar waves of several objects arrive from different distances at the receiving antenna array, the received signal shows correspondingly several difference frequency portions.

The evaluation of the received signal is carried out in the digital signal processor 26 of FIG. 1 by processing output signal sequences s of discrete values of the A/D converter 24. For each chirp 40 of the emitted signal, an allocated output signal sequence results. For each detected object, the output signal sequence contains a signal portion which is generated by means of reflections of this object. This signal portion has a frequency (that can be altered as a function of the time) and a distance-dependent phase position. The latter is obtained because the distance is generally not an integral multiple of a wavelength of the radar waves.

The digital signal processor 26 forms a first Fourier-transformed S of this output signal sequence s of real scanned values. This generally complex Fourier-transformed S is known to have a magnitude spectrum or amplitude spectrum and a phase spectrum.

FIG. 3a shows an example of an amplitude spectrum 44, and FIG. 3b shows an example of a corresponding phase spectrum 46 of a first Fourier-transformed S of a received signal.

The magnitude spectrum 44 indicates with which relative weight A a specific frequency is represented in the received signal. In a vector representation of the complex result value of the first Fourier transform, the length of a vector corresponds to a relative weight A. The weights A therefore are plotted against a frequency f. If a situation with two reflecting objects at different distances is considered, for example, peaks 48, 50 with two frequencies f_48, f_50 are obtained. The signals of the object at the shorter distance are comparatively weaker at the receiving antenna array 18, which is reflected in the lower amplitude of its peaks 48 in the magnitude spectrum 44.

In the phase spectrum 46, the phase positions $\phi\_48$, $\phi\_50$ of the signal portions, that is, the angular positions of the corresponding complex vectors, are reflected likewise in a plot against the frequency f. The phase positions $\phi\_48$, $\phi\_50$ are allocated to the frequency f_48, f_50, respectively, of their signal portion.

From the amplitude spectrum of the first Fourier-transformed S of a chirp, the distances of all of the objects detected within the active partial sector are determined. This applies to the first partial sector as well as to the second partial sectors. The distance is obtained as a product of the frequency shift by the light speed and the period duration of the modulation, divided by the bandwidth of the modulation and a factor of 2.

The speeds are preferably determined only in the first partial sectors. In order to determine the speeds, mutually successive chirps with index i, i=1, 2, ..., n_1 of the objects of a first partial sector n_1 are run through, and a Fourier-transformed Si of the real output signal sequence si and its phase spectrum are determined and stored for each chirp. A phase spectrum is understood herein as any spectrum of values containing phase information. The phase spectrum can therefore be in particular also the spectrum of the complex results of the first Fourier transform. In addition, the distances of reflecting objects may be determined based on at least one amplitude spectrum, which is evaluated for this purpose.

When the radar system 10 and the object move relative to each other, the phase of the corresponding received signal portion changes from chirp to chirp. These phase changes are reflected in the phase of the Fourier-transform and thus in its phase spectrum. A further phase spectrum results for each chirp.

FIG. 4 shows, in schematic representation, possible real parts Re of results of first Fourier transforms of signals which were reflected by two objects in a case of eight chirps. Hence, the real parts were respectively plotted against the frequency f and the time, with respect to the number P_1 to P_8 of a chirp. The real parts applied with a frequency f_48, f_50 belong respectively to one object each. In a vector representation of corresponding, complex numbers, each real part represents a projection of the complex vector on the real axis. The harmonics are obtained when the angular speed of the complex vector is constant. This angular speed is a measurement of the relative object speed within the time segment and can be considered to be at least approximately constant in a motor vehicle radar system. A period duration of the periodic change of the rear parts corresponds in particular to the time in which the distance between the radar system 10 and the object is changed by one half wavelength of the radar emission. As can be seen in FIG. 4, the period duration of the object, whose distance is characterized by means of the frequency f_48, is greater than the period duration in the case of frequency f_50. The greater period duration is obtained as a consequence of a lower speed within the time segment.

In the case of a radar frequency of approximately 24 GHz, the wavelength is approximately 1.25 cm. At a relative speed of, for example, 90 km/hr, the distance changes by about one half wavelength approximately every 25 microseconds, so that a phase change frequency of about 40 KHz is obtained.

This phase change frequency is obtained as a result (more accurately: as amplitude or magnitude spectrum) of a second Fourier transform which is applied on the discrete phase values or the corresponding complex result values of the first Fourier transforms for a corresponding object. The second Fourier transform is likewise calculated by means of the digital signal processor 26 according to known methods of fast Fourier transform (FFT). The corresponding phase change frequency for each further object is likewise obtained as a result of a further second Fourier transform. As an alternative to a separate calculation of a multitude of second Fourier transforms, the sought phase change frequencies can also be calculated by means of a two-dimensional Fourier transform.

It should be noted that the disclosure is not limited to the embodiment described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. A method for determining a distance of at least one object with respect to a motor vehicle, wherein the motor vehicle has a frequency modulated continuous wave (FMCW) radar system that is configured to emit and receive radar waves, based on a frequency shift between emitted and received radar waves and in which a speed of an object is determined based on the phase positions of the received radar waves, the method comprising:

determining at least one first distance and at least one first speed in at least one first time segment of at least one first object within at least one first partial sector of a proximity of the motor vehicle; and determining at least one second distance, but not a speed, in at least one second time segment of at least one second object within at least one second partial sector of the proximity.

2. The method according to claim 1, further comprising:

periodically modulating a frequency of the emitted radar waves resulting in a modulation;

determining the phase positions of a first number of periods of the modulation; and determining the frequency shift of a second number of periods of the modulation.

3. The method according to claim 2, wherein the second number of periods is smaller than the first number of periods.

4. The method according to claim 3, wherein the second number of periods is equal to 1 and the first number of periods is greater than or equal to 16.

5. The method according to claim 4, wherein the first number of periods is equal to 32.

6. The method according to claim 1, wherein the steps of determining the at least one first and second distances further comprise determining the at least one first and second distances with the aid of a first Fourier transform, the first Fourier transform being applied to a low pass filtered mixture product of an emitted signal and a received signal, the step of determining the at least one first speed of the at least one first object further comprising determining the at least one first speed with the aid of at least one second Fourier transform, the at least one second Fourier transform being applied to phase positions of the results of the first Fourier transform.

7. The method according to claim 6, wherein different objects are differentiated from each other by virtue of at least one of the following: their distances with respect to the motor vehicle and their speeds with respect to the motor vehicle.

8. The method according to claim 2, wherein a period duration of the modulation of emitted radar waves is smaller than 0.5 ms.

9. The method according to claim 1, wherein the at least one first and second partial sectors each individually cover a coherent detection range of the radar system and a number of the at least one first partial sectors is smaller than a number of the at least one second partial sectors.

10. A radar system for a motor vehicle, wherein the radar system is configured to emit and receive radar waves, the radar system being configured to determine a distance to an object with respect to the motor vehicle based on a frequency shift between emitted and received radar waves, the radar system being configured to determine a speed of an object based on the phase positions of the received radar waves, the radar system being configured to determine at least one first distance and at least one first speed in at least one first time segment for at least one first object within at least one first partial sector of a proximity of the motor vehicle, the radar system being configured to determine at least one second distance, but not a speed, in at least one second time segment for at least one second object within at least one second partial sector of the proximity.

11. The radar system according to claim 10, wherein the radar system is configured to periodically modulate a frequency of the emitted radar waves to provide a modulation, the radar system being configured to determine phase positions of a first number of periods, the radar system being configured to determine the frequency shift of a second number of periods of the modulation.

12. The radar system according to claim 11, wherein the second number of periods is smaller than the first number of periods.

13. The radar system according to claim 11, wherein the second number of periods is equal to 1 and the first number of periods is greater than or equal to 16.

14. The radar system according to claim 13, wherein the first number is equal to 32.

15. The radar system according to claim 10, wherein the radar system is configured to determine the at least one first and second distances with the aid of a first Fourier transform, the first Fourier transform being applied to a low pass filtered mixture product of an emitted signal and a received signal, the at least one first speed of the at least one first object being determined with the aid of at least one second Fourier transform, the at least one second Fourier transform being applied to phase positions of the results of the first Fourier transform.

16. The radar system according to claim 15, wherein the radar system is configured to differentiate different objects from each other by virtue of at least one of the following: their distances with respect to the motor vehicle and their speeds with respect to the motor vehicle.

17. The radar system according to claim 16, wherein a period duration of the modulation of emitted radar waves is smaller than 0.5 ms.

18. The radar system according to claim 10, wherein the at least one first and second partial sectors each individually cover a coherent detection range of the radar system and a number of the at least one first partial sectors is smaller than a number of the at least one second partial sectors.

* * * * *